Aug. 26, 1941.　　　G. HARBACK　　　2,253,855
METHOD OF CLEANING PANS
Filed Sept. 21, 1939
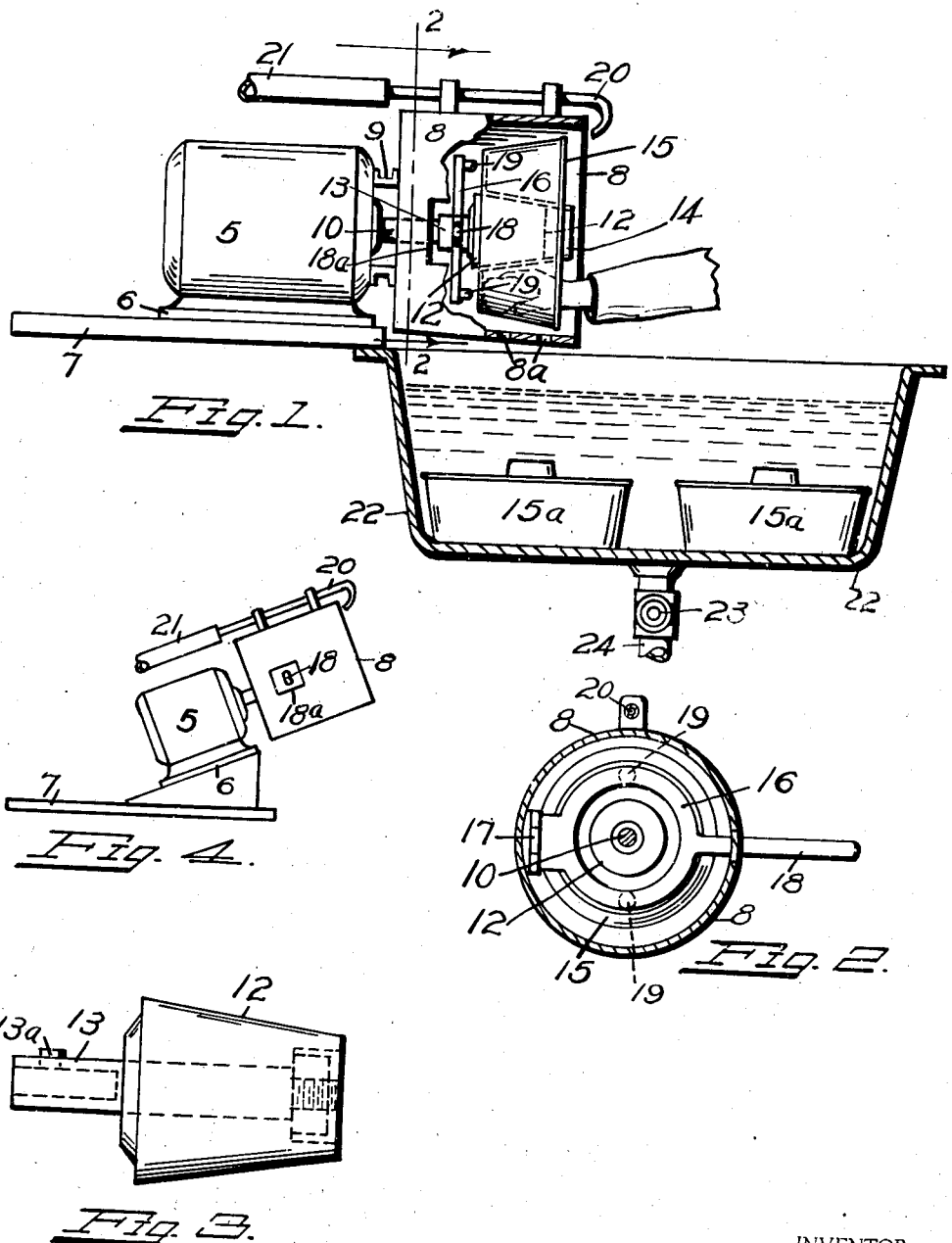
INVENTOR.
GEORGE HARBACK
BY
Rollander, McGrew & Campbell
ATTORNEYS Patented Aug. 26, 1941

2,253,855

UNITED STATES PATENT OFFICE 2,253,855

METHOD OF CLEANING PANS

George Harback, Denver, Colo.; Mable C. Harback administratrix of said George Harback, deceased Application September 21, 1939, Serial No. 295,852

1 Claim. (Cl. 15—269)

This invention relates to improved method and means for cleaning professional bakers' pans.

In a commercial bakery, a relatively large number of pans are in daily use for the purpose of baking cakes, particularly "angel food" cakes. When the baked cakes are removed from the pans, a certain amount of the baked dough persists in adhering to the inner surfaces of the pans. This material is particularly difficult to remove after an angel food cake has been baked because of the particular ingredients in the angel food cake dough.

Since such pans are to be used over and over again, the problem of keeping the inner surfaces thereof clean and free from adhering dough is a big one in commercial bakeries. In a commercial bakery of any size, many hours each week are required to clean the cake pans. Heretofore, hand-cleaning has been largely used but, as above pointed out, certain types of dough adhere with considerable tenacity to the inner pan surfaces, making them difficult to clean by hand.

Furthermore, such pans commonly become dented or otherwise deformed in use, thus adding to the difficulty of cleaning them. If a small amount of cake dough adheres to the inner surface of the pan and another cake is baked therein, then the dough of the second cake is much more liable to stick at the place where the old dough was sticking.

Where a dirty pan having dough adhering to its inner surfaces is used for successive bakings, the dough may stick to such an extent that the cake will be damaged so much that it cannot be sold, thus representing a loss to the bakery.

These problems are well understood by those skilled in the art and are merely pointed out herein to make a general disclosure of the problems existing in commercial bakeries that are satisfactorily solved by the present inventive concept. General sanitation and economic efficiency demand an improved method and means for cleaning cake pans in commercial bakeries.

The principal object, therefore, of the present inventive concept is to provide an improved method and means whereby cake pans used in commercial bakeries or the like, can be quickly and thoroughly cleaned between each use.

Another object is to provide such a method and means that is safe and convenient for the operator to use.

Other objects and advantages reside in details of design and construction which will be more fully disclosed in the following description and in the drawing wherein like parts have been similarly designated and in which:

Figure 1 is a general elevation partially in section, of apparatus built according to the present inventive concept, and that is well adapted to perform the improved method;

Figure 2 is a sectional view taken along the line 2—2 of Figure 1;

Figure 3 is an enlarged elevation of certain details shown in Figure 1; and

Figure 4 is a diagrammatic representation of a modified mounting of a portion of the apparatus shown in Figure 1.

In order to disclose an operable reduction to practice of the present inventive concept, reference will be had to the accompanying drawing. However, since changes may occur to those skilled in the art, and since the present method could be performed by other apparatus, the instant example is not intended to express or imply any limitation to this invention, the real scope of which is measured by the appended claims.

Apparatus according to this invention may be built as shown in the accompanying drawing, wherein reference character 5 denotes an electric motor having a base 6 mounted upon a suitable board or other type of support indicated at 7.

A cylindrical housing 8 having drain holes 8a positioned adjacent its lower portion, is mounted upon motor 5 by means of brackets 9.

The motor shaft 10 carries a frustro-conical chuck 12 through the intermediary of a socketed hub 13 on the chuck 12. The conical chuck 12 engages a similarly shaped central opening in the center cone 14 of a typical angel food cake pan 15. Thus the pan 15 is supported for rotation upon the chuck 12, where it remains by means of a frictional engagement between the inner surface of the central conical opening of the pan 15 and the outer surface of the chuck 12, until ejected.

The details of the chuck 12 are best illustrated in Figure 3, wherein the socketed hub 13 is shown provided with a set screw 13a which is for the purpose of securing the chuck to the motor shaft 10.

The main frustro-conical portion of the chuck 12 may be made of material such as wood, rubber, micarta, composition, or any other material having suitable physical properties. The part 12 is preferably made of rubber or other flexible material, because such material adapts itself to gripping the inner conical surface of the center of the pan. This feature is particularly advantageous when the center cone of the pan is bent or distorted from its original shape. The invention is not limited to any particular kind of material in the chuck 12.

In order to remove the pans from the chuck 12, an ejector ring 16, Figure 2, is hinged within the cylindrical housing 8 as shown at 17, and is provided with a handle 18 that projects through an opening indicated at 18a in the side of the cylindrical housing 8. The ejector ring 16 is provided with a plurality of contact bosses 19, which preferably are non-metallic and may be made of rubber, wood, fiber, composition or the like, and are for the purpose of contacting the bottom of the pan 15 by movement of the handle 18 and the ejector ring 16.

A water-conductive tube 20 terminates in a portion bent toward the pan 15 as it is positioned on the chuck 12, and is connected through the intermediary of a hose or the like 21, with any convenient source of water under pressure such as a city water faucet.

The assembly hereinabove described is mounted adjacent a deep sink 22 so that the cylindrical housing 8 is thereabove. A body of water is shown in the sink 22 and the drainage from said sink is under manual control by means of a common valve 23 in a drain pipeline 24. A plurality of cake pans 15a are shown in the sink 22 immersed in the water.

In performing the improved method and in using the apparatus herein illustrated and described, an operator preferably places the dirty pans 15a in a body of cold or room temperature water in the sink 22 in order to loosen the cake dough adhering to their inner surfaces. It has been found that angel food cake dough in particular, is best softened in water having a temperature of the room or colder, in contradistinction from warm water, because of the ingredients, particularly the eggs, in such dough.

After the pans 15a have soaked for a while, preferably about fifteen minutes, one pan is mounted upon the chuck 12 on the motor 5 by means of the center cone 14 of the pan engaging said chuck. Upon starting the motor 5 the pan 15 is rotated conjointly with said motor and simultaneously, a small amount of water is discharged through the end of water-conductive tube 20 into the rotating pan 15.

As the pan rotates and the water is discharged thereinto, an operator grasps a cleaning medium which preferably is a metallic cloth or the like, and holds said cleaning medium against the inner surfaces of the pan 15 as indicated in Figure 1. The cleaning medium used may be anything preferred by the operator, but a cleaning cloth or pad composed of or containing metal shreds has been found highly satisfactory.

As the pan rotates at relatively high speed, the operator may contact the entire inner surface of the pan with the cleaning medium in a comparatively short time, and since the pan rotates uniformly, the operation results in a quick and through cleaning of all interior surfaces.

The water discharged through the tube 20 facilitate cleaning and tends to flush away removed cake dough or other foreign matter, which is flushed into the sink 22. The valve 23 below the sink 22 is opened to permit a discharge from the sink 22 that is approximately equivalent to the input of water to the sink from the pans being cleaned, or, in other words, from the water-conductive tube 20. This setting of the discharge valve 23 maintains a body of water in the sink 22 as long as the cleaning process is being performed.

It would be practically impossible to clean a cake pan by hand or any other ordinary method, as thoroughly, uniformly, conveniently and quickly as by the present method and means.

If the motor 5 is positioned below the line of vision of an operator, it may be advantageous to mount it on an angle so that the cylindrical housing 8 and a cake pan therein mounted upon the shaft of the motor 5 are positioned at an upwardly inclined angle as shown in Figure 4. This angular mounting of the motor 5 and its associated mechanism facilitates operation and permits the operator to inspect the cleaning process more readily than a horizontal mounting, unless the horizontal mounting is elevated to improve the visibility of the operation.

For purposes of an operable disclosure, the sink 22 has been shown as containing two pans 15a which are being soaked as the preliminary step in the cleaning method. However, it is to be understood that a much larger sink or tank 22 may ordinarily be used and many more than two pans 15a may be soaked at one time in advance of the next cleaning step.

As soon as adhering cake dough and other foreign matter have been loosened and removed from the rotating pan 15, an operator may quickly loosen the pan from the chuck 12 by means of the handle 18 moving the ejector ring 16 to bring the injector bosses 19 in contact with the bottom of the pan to break the frictional engagement between the pan and the conical chuck 12. As soon as this engagement is relieved or broken, an operator may readily and quickly grasp the pan, remove it from the cylindrical housing 8 and set it aside for reuse. Another pan 15a having been soaked in the sink 22 may then be placed upon the chuck 12, while the motor continues to operate, whereupon the frictional engagement between the conical chuck 12 and the hollow central cone 14 of the pan in the position shown at 15, will be quickly established.

The above set forth cleaning operation will then be repeated and these cycles will be continued until the batch of dirty pans have been made clean and sanitary ready for the next baking operation.

Thus certain problems that are well-known to the baking industry are solved and the stated objects of the present invention are well fulfilled. While this specification discloses preferred means for reducing the present invention to practice and a preferred embodiment of the invention, changes may occur to those skilled in the art and may be made within the scope of the appended claim, without departing from this inventive concept.

What I claim and desire to secure by Letters Patent is:

The method of cleaning the inside surfaces of a cake pan or the like having an outwardly flaring side wall, comprising the steps of initially soaking the pan in liquid at approximately room temperature to soften and loosen adhering matter therein, continuously rotating the pan at a relatively high rate of speed about an axis inclined from the vertical and with the open side of the pan uppermost to maintain internal visibility, directing a stream of liquid into the pan through the open side from a point adjacent the upper rotating edge of the pan and holding a pad containing metallic cleaning fibres in relatively stationary position against the lower inner rotating surfaces of the pan.

GEORGE HARBACK.